(12) United States Patent
Večeřa et al.

(10) Patent No.: US 10,127,317 B2
(45) Date of Patent: Nov. 13, 2018

(54) PRIVATE CLOUD API

(71) Applicant: Red Hat, Inc., Raleigh, NC (US)

(72) Inventors: Martin Večeřa, Brno (CZ); Jiri Pechanec, Mokra-Horakov (CZ)

(73) Assignee: RED HAT, INC., Raleigh, NC (US)

( * ) Notice: Subject to any disclaimer, the term of this patent is extended or adjusted under 35 U.S.C. 154(b) by 160 days.

(21) Appl. No.: 14/489,933

(22) Filed: Sep. 18, 2014

(65) Prior Publication Data
US 2016/0085861 A1 Mar. 24, 2016

(51) Int. Cl.
*G06F 21/00* (2013.01)
*G06F 17/30* (2006.01)
*G06F 9/54* (2006.01)
*H04L 29/06* (2006.01)

(52) U.S. Cl.
CPC ........ *G06F 17/30864* (2013.01); *G06F 9/547* (2013.01); *H04L 63/0442* (2013.01); *H04L 63/126* (2013.01)

(58) Field of Classification Search
CPC .................................................. H04L 63/205
See application file for complete search history.

(56) References Cited

U.S. PATENT DOCUMENTS

| | | | | |
|---|---|---|---|---|
| 7,039,946 B1 * | 5/2006 | Binding | .............. | H04L 63/0823 380/259 |
| 2006/0143702 A1 * | 6/2006 | Hisada | ................ | H04L 12/4641 726/15 |
| 2010/0064033 A1 | 3/2010 | Travostino et al. | | |
| 2010/0250955 A1 * | 9/2010 | Trevithick | .............. | G06F 21/31 713/185 |
| 2010/0318782 A1 | 12/2010 | Auradkar et al. | | |
| 2011/0022642 A1 * | 1/2011 | deMilo | ............. | G06F 17/30082 707/805 |
| 2012/0054345 A1 | 3/2012 | Sahu et al. | | |
| 2012/0110651 A1 | 5/2012 | Van et al. | | |
| 2012/0179824 A1 * | 7/2012 | Jackson | ................ | G06F 9/5027 709/226 |
| 2012/0222084 A1 * | 8/2012 | Beaty | .................. | H04L 43/0817 726/1 |
| 2013/0073703 A1 * | 3/2013 | Das | ......................... | H04L 67/10 709/223 |
| 2014/0108665 A1 | 4/2014 | Arora et al. | | |

FOREIGN PATENT DOCUMENTS

CN 103634413 A 3/2014

OTHER PUBLICATIONS

Amazon Virtual Private Cloud; Jun. 15, 2014; http://docs.aws.amazon.com/AmazonVPC/latest/UserGuide/vpc-peering.html.

(Continued)

*Primary Examiner* — John B King
(74) *Attorney, Agent, or Firm* — Haynes and Boone, LLP

(57) ABSTRACT

Methods, systems, and computer program for implementing a private cloud are provided. A computer-implemented method may include registering a private cloud in a central registry; retrieving private cloud registration data from the central registry; sharing the private cloud registration data with other users; and allowing other users to connect to the private cloud using the shared private cloud registration data.

20 Claims, 4 Drawing Sheets

(56) References Cited

OTHER PUBLICATIONS

Yongdong Wu, Vivy Suhendra, Hauaqun Gua; A Gateway-Based Access Control Scheme for Collaborative Clouds; 2012; https://www.google.com/url?sa=t&rct=j&q=&esrc=s&source=web&cd-17&cad=rja&uact=8&ved=OCFEQFjAGOao&url-http%3Z%2F%2Fwww.thinkmind.org%2Fdownload.php%3Farticleid%3Dicimp_20012_2_40_30067&ei=q5nQU4nDYKOuASkvoGYAg&usg=AFQjCNGsuYXPmvorj-nnxZ2_4p91uBDOQ&bvm-bv.71667212,d.c2E.

Jin-Mook Kim, Jeong-Kyung Moon; Feb. 20, 2014; http://www.hindawi.com/journals/ijdsn/2014/828092.

Right Scale My Cloud Private and Hybrid Cloud Management; http://assets.rightscale.com/61c81953855c389140bbce8ab244e4f96a785753/web/PDFs/rightscale-mycloud-solution-brief.pdf.

\* cited by examiner

PRIVATE CLOUD API

BACKGROUND

A public cloud generally refers to a model of cloud computing that is open to data storage from a plurality of users, such as organizations or individuals. A public cloud is typically located remotely from the users and controlled by a third-party vendor. A public cloud typically is secured with at least user-based authentication measures and may also be secured by cryptography means.

In recent years, there have been highly publicized leaks of data from public clouds. This has caused concern by data storage users regarding the control of their data by the third-party vendor. Users of a public cloud may not know where the data is stored, who the data is shared with, and what security measures are employed to protect the data. Users may have particular data storage needs that a public cloud may not support. For example, a user may have a data policy that the data be stored within a national boundary as opposed to in a foreign nation. In another example, a user may not want to trust a third-party vendor with control over sensitive data.

Some users have responded to these concerns by storing data at a private cloud. A user may configure a private cloud on a system under the user's control, which allows the user to customize the private cloud to suit the user's particular data storage needs. Typically the private cloud data storage would be restricted to a particular user or a particular set of users, such as users from a particular organization or family.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
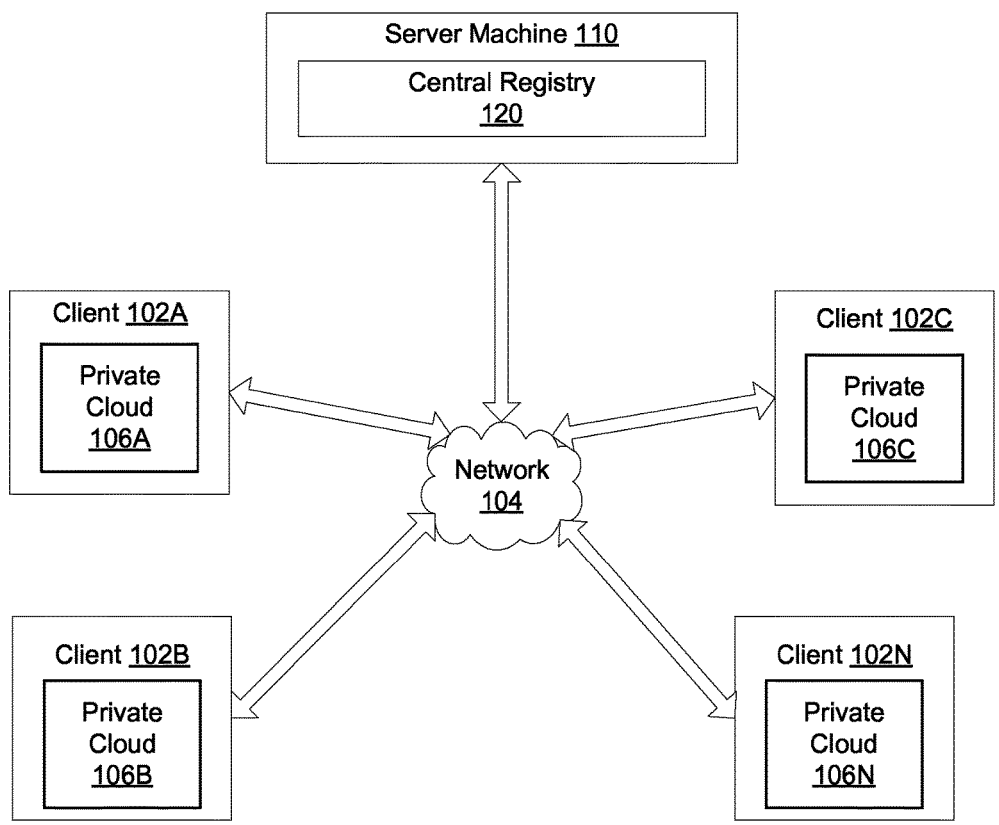
FIG. 1 is a block diagram illustrating a system architecture for data communications, in accordance with various examples of the present disclosure.

FIG. 1 illustrates an exemplary system architecture 100 in which examples of the present disclosure can be implemented. System architecture 100 includes clients 102A-102N (e.g., user machines) and server machine 110 connected to network 104. Network 104 may be a public network (e.g., the Internet), a private network (e.g., a local area network (LAN) or wide area network (WAN)), or a combination thereof.

In an example, network 104 may include the Internet and/or one or more intranets, landline networks, wireless networks, and/or other appropriate types of communication networks. In one example, network 104 may comprise a wireless telecommunications network (e.g., cellular phone network) adapted to communicate with other communication networks, such as the Internet.

Clients 102A-102N may be computing devices, such as personal computers (PC), laptops, mobile phones, smart phones, smart televisions, tablet computers, or any other type of computing device. Clients 102A-102N may run an operating system (OS) that manages hardware and software of a respective machine. Each operating system may be any standard or proprietary OS. A browser may run on clients 102A-102N (e.g., on the OS of a client 102A). The browser may be a web browser that can access content and services provided by central registry 120 of server machine 110. Further, other types of software applications running on clients 102A-102N may provide access to content and services of server machine 110 without the use of a browser.

In the present example, clients 102A-102N may each include a respective private cloud 106A-106N (e.g., client 102A includes private cloud 106A, client 102B includes private cloud 106B, and so forth). Each private cloud 106A-106N may store data for a particular entity, such as a person, family, group, university or business, or for a plurality of entities. Each private cloud 106A-106N may be any standard or proprietary data store.

In one example, one or more of private clouds 106A-106N is a virtual data store.

In one example, private clouds 106A-106N may include an access control list or other access control mechanism that is configured with access privileges for users. The access control mechanism is structured to define privileges for individual data elements or groups of elements. Private clouds 106A-106N may include functionality for defining access privileges, configuring stored cryptography keys, and other configuration settings.

In the present example, each private cloud 106A-106N is configured to implement API functions. In this example, each API function is defined by a public API, which is shared between clients 102A-102N, private clouds 106A-106N and central registry 120. In another example, the API functions, as defined by the public API, are implemented at some, but not all, of private clouds 106A-106N.

It is not necessary that clients 106A-106N be configured with a private cloud in order to interact with other clients and server machine 110. For example, a client may host a private cloud on a separate machine or network drive. In another example, there may be a client that is not associated with a private cloud, but that is configured to receive data from other clients.

Server machine 110 may be a rackmount server, a router computer, a personal computer, a portable digital assistant, a mobile phone, a laptop computer, a tablet computer, a camera, a video camera, a netbook, a desktop computer, a media center, or any combination thereof.

In the present example, server machine 110 includes central registry 120, which includes functionality for certifying private clouds and integrating users. In other examples, functionality associated with central registry 120 is combined, divided and organized in various arrangements. For example, certification and user integration functionality may be provided by one or more different machines. Central registry data may be stored in any standard or proprietary database, and may be stored on server machine 110 and/or one or more alternate machines.

In an example, some clients 102A-102N may include applications associated with a service provided by server machine 110 (e.g., applications, mobile applications, "apps"). In one example, one or more device types (e.g., smart phones, smart televisions, tablet computers, etc.) may use applications to access content provided by server machine 110, to issue commands to central registry 120, or to receive content from central registry 120 without accessing or using web pages.

In an example, functions performed by server machine 110 and central registry 120 also may be performed by the clients 102A-102N and private clouds 106A-106N, in whole or in part. In addition, the functionality attributed to a particular component may be performed by different or multiple components operating together. Central registry 120 also may be accessed as a service provided to other systems or devices via appropriate APIs, and thus is not limited to use in websites.

Figure 2:
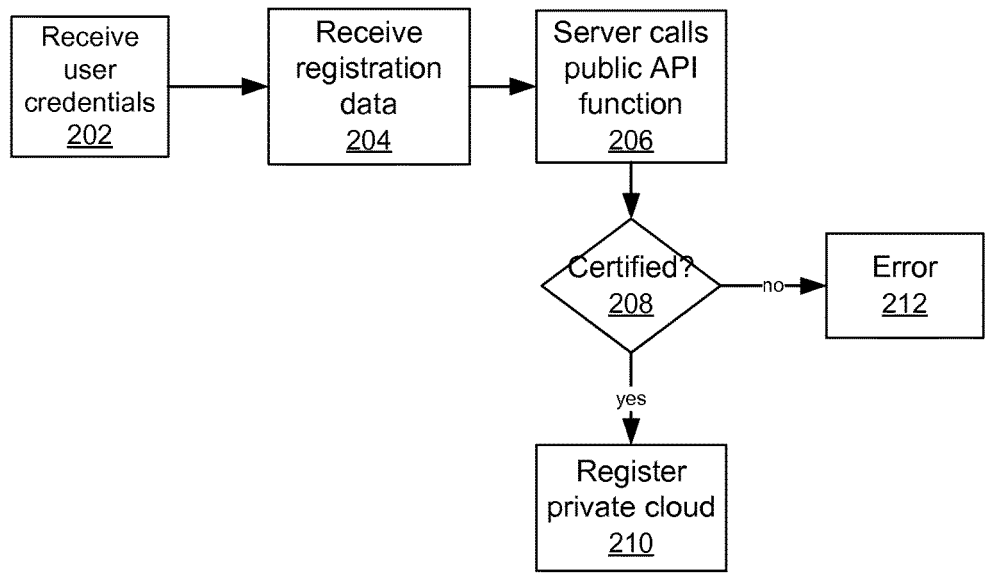
FIG. 2 is a flow diagram illustrating the registration of a private cloud with a central registry, according to an example of the present disclosure.

FIG. 2 is a flow diagram illustrating the registration of a private cloud with a central registry, according to an example of the present disclosure. Method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 begins at block 202 when a central registry receives a user authentication request (such as a user login request) from a client computing device. In an example, the user initiates an authentication request using an application running on a client computing device operated by the user. For example, the user may initiate an authentication request using a mobile "app" running on a mobile client computing device operated by the user. In one example, an application running on the client computing device of the user is coupled to the central registry via a network, and communicates with the central registry directly or via an API and/or web services. In some examples, the user may initiate an authentication request using a web application, text messaging, instant messaging, or using any software application(s) installed on or invoked by a client computing device.

In an example, a user inputs or provides authentication request information to a software application to login to an existing account. For example, a user may enter authentication request information into a graphical user interface (GUI) of an application or may provide textual input (e.g., one or more strings of characters) to initiate an authentication request. In one example, an authentication request comprises one or more of an identifier of a requesting user and a password. In another example, a security token is additionally provided in the authentication request. In a further example, biometric sensors may be used to identify a user.

Once the user is authenticated, processing proceeds to block 204. If the user is not authenticated, the user may again attempt to login, or may receive an error message. If the user does not have an existing account, the user may be asked to provide information in order to create an account. In one example, user provided information to create an account may include a name, username, password, email address, phone number, or other contact information. The information may be accessible to other users, such as through a searchable contact page for the user, or in another type of user listing. In this example, the user information may be stored in a searchable database on the central registry or in another location accessible to the central registry.

At block 204, the central registry receives registration data from a user to register a private cloud (e.g., private cloud 106A on client 102A). Registration data may include a descriptor for the private cloud, such as location data and a public key for the private cloud. Location data may include an internet protocol (IP) address. In another example, the IP address may be determined automatically by the central registry based upon detection of the IP address of the computing device from which the user is accessing the central registry.

In the present example, the user may input a public key with the registration data. The central registry may provide the public key to other users so that the other users may encrypt communications that are sent to the user's private cloud. In another example, the central registry generates a public/private key pair for the user. In one example, the public/private key pair is generated using any standard or proprietary application, such as OPENSSL.

At block 206, the central registry attempts to determine whether the private cloud supports a public API. This may be performed by sending a request to the private cloud. The request includes a function call that is implemented by the public API. Examples of functions that are supported by the public API include functions for accessing data on the private cloud and providing information regarding data stored on the private cloud such as determining the total number of files shared, names of the files, file locations, and the like. Central registry 120 determines whether private cloud 106A responds to the request with an expected response. For example, an expected response to a function call for a number of files may be a positive integer. In another example, special characters or other data from the response may be compared to the sent request to determine whether the data is preserved as expected. One or more functions may be called. For example, a plurality of function calls may be sent to the private cloud to test whether the private cloud implements the public API.

At block 208, if the response from the private cloud is indicative that the private cloud implements the public API (e.g., the response from the private cloud matches an expected response), then the central registry may certify the private cloud by registering the private cloud at block 210.

In one example, registering the private cloud includes the central registry storing registration data, such as private cloud descriptors including the IP address and public key for the private cloud, in a searchable database.

In one example, if the private cloud does not respond to the function call from the central registry, or if the private cloud does not respond in the expected way, then the central registry determines that the private cloud does not implement the public API. In this example, an error may be generated in block 212 that informs the user that the private cloud is not certified.

In the present example, the private cloud descriptors that are stored by the central registry are searchable to other users of the central registry. For example, a user may search for descriptors for a particular private cloud of another user in order to determine the location and public key needed to request data from that other user's private cloud.

Figure 3:
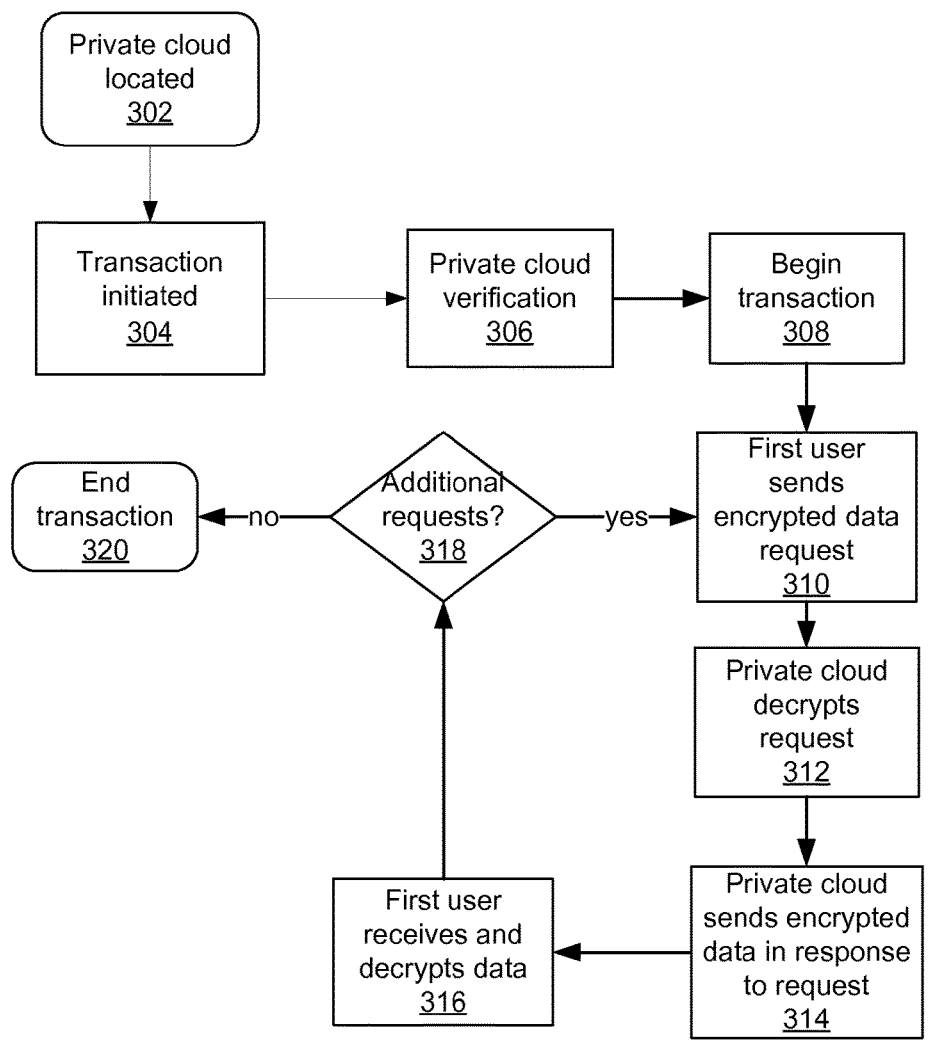
FIG. 3 is a flow diagram illustrating a secure transaction between users, according to an example of the present disclosure.

FIG. 3 is a flow diagram illustrating a secure transaction between users, according to an example of the present disclosure. The method 300 may be performed by processing logic that may comprise hardware (e.g., circuitry, dedicated logic, programmable logic, microcode), software (such as instructions run on a general purpose computer system, dedicated machine, or processing device), firmware, or a combination thereof.

At block 302, a first user may access a central registry with login credentials. In one example, the first user executes a web browser to interact with the central registry. In another example, an application on the computing device of the first user, such as a mobile app, is executed to interact with the central registry. Upon logging in, the first user may submit a search on the central registry to locate a particular second user, such as a friend, family member, co-worker, or business entity. For example, the first user may input a name, username, email, phone number, or other contact information in order to search a data store on the central registry that contains user information. In another example, the first user has previously located the second user, and has access to the second user on a stored contact list.

In the present example, social networking features are supported, such as inviting other users to join the central registry, messaging other users, and organizing users on a contact list into groups.

In the present example, each user may be associated with a private cloud that implements a public API, and each private cloud may be registered in the central registry.

In one example, a first user adds a second user to a contact list and/or authorizes access of the second user to the first user's private cloud by accepting the public key corresponding to the second user.

In the present example, each private cloud implements a public API. The first user may communicate with another user's private cloud sending function calls to the private cloud, according to data parameters as defined by the public API.

At block 304, the first user may initiate a transaction with the second user, by identifying the second user on the central registry and requesting to access data from the second user's private cloud. In one example, the first user identifies the second user as the user to request data from and initiates the request by selecting the second user from a contact list or other listing.

In the present example, the central registry provides the first user with the location data and public key for the second user's private cloud. In another example, the first user may store the location data and public key for the second user's private cloud, so that the first user does not need to request that data from the central registry in later transactions.

The first user may send an access request to the second user's private cloud at the location provided by the central registry. A connection may be established between the first user and the second user's private cloud using any standard or proprietary protocol (e.g., TCP/IP).

In the present example, the request may include an identifier of the first user, such as a username or email address. The identifier may be encrypted with the first user's private key. The request may then be encrypted with the second user's public key so that only the second user's private cloud may read the request.

At block 306, the second user's private cloud may decrypt the access request using the second user's private key. In this example, the second user's private cloud then applies a cryptographic verification to determine that the request was sent by the first user. The second user's private cloud inputs the first user's public key and the identifier into a decryption function. In this example, if the decryption function output the first user's email address, then the second user's private cloud determines that the request was sent from the first user.

In this example, the public key for each user may be obtained by accessing the central registry, such as via a searchable database, or the private cloud may store a public key for another user locally. In this example, the private key for the first user is stored on a computing device of the first user. The private key for the second user is stored on a computing device of the second user, where the private key is accessible to a second user's private cloud.

Once the first user is verified, the second user's private cloud determines whether the first user has been granted access by the second user to data stored on the second user's private cloud. In the present example, the second user's private cloud is configured with access privileges for the first user and other users. If the second user's private cloud determines that the first user has access privileges that grant access to the first user, then the method proceeds to block 308.

At block 308, the first user has been authorized by the second user's private cloud to access data stored on the second user's private cloud. The data may be organized in directories and access privileges may be specified in an access list such that the first user is allowed to access a particular subset of the data stored on the second user's private cloud. In one example this data may be image, document, video, sound, executable files or other data.

In one example, the second user's private cloud may send the first user with an identification of data for which the first user has been granted access.

At block 310, the first user may send a data request to the second user's private cloud to retrieve data for which the first user has been granted access. In the present example, the requests that are sent from the first user to the second user's private cloud are encrypted with the second user's public key. The first user may browse the data by sending requests to navigate through the directory structure of the second user's private cloud, in order to locate particular data. In another example, the request is to modify or upload data to the second user's private cloud.

In another example, an application of the first user, such as a document editing application, may be extended such that the document editing application may request a document from the second user's private cloud. Each private cloud may support features such as shared editing of data, such as allowing a plurality of users to access a private cloud at the same time to read and modify the data.

At block 312, the second user's private cloud may decrypt the request with the second user's private key.

At block 314, the second user's private cloud locates the requested data. If the request is a data retrieval request, the second user's private cloud encrypts the requested data, which may be in binary and/or text format, with the first user's public key and sends the encrypted data to the first user. In another example, instead of downloading data, the first user request may be to upload data to the second user's private cloud, or to modify data on the second user's private cloud. Depending upon the access privileges that the second user's private cloud has configured for the first user, the first user may be allowed any combination of read, write, and/or execute access.

At block 316, the first user receives the encrypted data from the second user's private cloud and decrypts the encrypted data with the first user's private key.

A block 318, if the first user has additional requests, then the method may continue at block 310. If the first user does not have additional requests, then the transaction is ended at block 320. If a connection was established between the first user and the private cloud, then the first connection disconnects from the private cloud following the end of the transaction at block 320.

Figure 4:
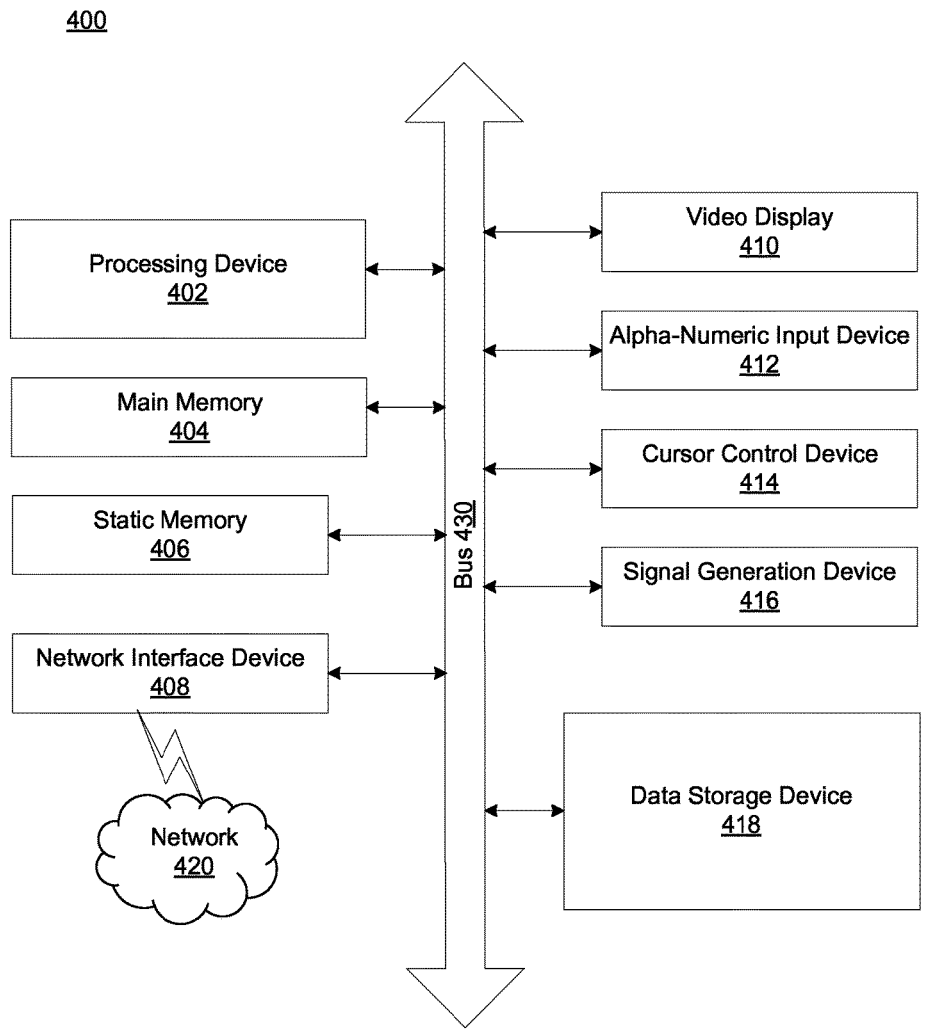
FIG. 4 is a flow diagram illustrating an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), etc.), static memory 406 (e.g., flash memory, static random access memory (SRAM), etc.), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

In one example, the instructions are for enforcing separation of environments using cryptography (computing system 100 of FIG. 1) and/or a software library containing methods that call a system for enforcing separation of environments using cryptography. While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system, comprising:
a central registry server structured with a memory and a processor, the processor in communication with the memory to perform operations comprising:
receiving, from a first client computing device, at least one private cloud descriptor corresponding to a first private cloud, the at least one private cloud descriptor comprising a location and a public key;
testing an ability of the first private cloud to respond to a function of a central registry server, wherein the testing includes sending, by the central registry server to the first private cloud, a function call to access data on the first private cloud;
determining, based on the testing, that the first private cloud implements a function in the function call by comparing a response from the first private cloud to an expected response;
registering, responsive to the determining, the first private cloud on the central registry server using the received private cloud descriptor;
receiving, from a second client computing device associated with a second registered private cloud on the central registry server, a request for the at least one private cloud descriptor;
locating, by the central registry server, the at least one private cloud descriptor, and sending the at least one private cloud descriptor to the second client computing device;
receiving, from the second client computing device, an encrypted access request at the location provided by the at least one private cloud descriptor to access the registered first private cloud, wherein the encrypted access request is encrypted by the second client computing device using the at least one private cloud descriptor, and wherein the encrypted access request includes an encrypted identifier that is encrypted using a private key of a user;
determining, based on the encrypted access request, that the second client computing device is configured with access privileges to access the first private cloud; and
granting access to the second client computing device to access the first private cloud based on the determining that the second client computing device is configured with access privileges.

2. The system of claim 1, wherein the comparing comprises determining whether at least one data type in the response of the first private cloud matches an expected data type.

3. The system of claim 1, wherein the location is an Internet Protocol (IP) address.

4. The system of claim 1, wherein communications between the central registry server and the first private cloud and the second private cloud are protected with cryptography.

5. The system of claim 1, wherein communications between the central registry server and the first client computing device and the second client computing device are protected with cryptography.

6. The system of claim 1, wherein the function call is for an amount of files shared by the first private cloud, and wherein the expected response is a positive integer.

7. The system of claim 1, wherein the function call is for a name of a file stored on the first private cloud.

8. The system of claim 1, wherein the function call is for a location of a file stored on the first private cloud.

9. The system of claim 1, wherein receiving the public key includes generating the public key, and wherein receiving the location includes detecting a location corresponding to a computing device that is accessing the central registry server.

10. A method comprising:
receiving, on a machine that includes a memory and a processor, at least one private cloud descriptor from a first client computing device corresponding to a first private cloud, the at least one private cloud descriptor comprising a location and a public key;
testing an ability of the first private cloud to respond to a function of a central registry server, wherein the testing includes sending, by the central registry server to the first private cloud, a function call to access data on the first private cloud;
determining, based on the testing, that the first private cloud implements a function in the function call by comparing a response from the first private cloud to an expected response;
registering, responsive to the determining, the first private cloud on the central registry server using the received private cloud descriptor;
receiving, from a second client computing device associated with a second registered private cloud on the central registry server, a request for the at least one private cloud descriptor;
locating, by the central registry server, the at least one private cloud descriptor, and sending the at least one private cloud descriptor to the second client computing device;
receiving, from the second client computing device, an encrypted access request at the location provided by the at least one private cloud descriptor to access the registered first private cloud, wherein the encrypted access request is encrypted by the second client computing device using the at least one private cloud descriptor, and wherein the encrypted access request includes an encrypted identifier that is encrypted using a private key of a user;
determining, based on the encrypted access request, that the second client computing device is configured with access privileges to access the first private cloud; and
granting access to the second client computing device to access the first private cloud based on the determining that the second client computing device is configured with the access privileges.

11. The method of claim 10, wherein the comparing comprises determining whether at least one data type in the response of the first private cloud matches an expected data type.

12. The method of claim 10, wherein the location is an Internet Protocol (IP) address.

13. The method of claim 10, wherein the function call is for an amount of files shared by the first private cloud, and wherein the expected response is a positive integer.

14. The method of claim 10, wherein the function call is for a name of a file stored on the first private cloud.

15. The method of claim 10, wherein the function call is for a location of a file stored on the first private cloud.

16. A non-transitory computer-readable medium storing instructions executable to cause one or more processors to perform operations comprising:

receiving, from a first client computing device, at least one private cloud descriptor corresponding to a first private cloud, the at least one private cloud descriptor comprising a location and a public key;

testing an ability of the first private cloud to respond to a function of a central registry server, wherein the testing includes sending, by the central registry server to the first private cloud, a function call to access data on the first private cloud;

determining, based on the testing, that the first private cloud implements a function in the function call by comparing a response from the first private cloud to an expected response;

registering, responsive to the determining, the first private cloud on the central registry server using the received private cloud descriptor;

receiving, from a second client computing device associated with a second registered private cloud on the central registry server, a request for the at least one private cloud descriptor;

locating, by the central registry server, the at least one private cloud descriptor, and sending the at least one private cloud descriptor to the second client computing device;

receiving, from the second client computing device, an encrypted access request at the location provided by the at least one private cloud descriptor to access the registered first private cloud, wherein the encrypted access request is encrypted by the second client computing device using the at least one private cloud descriptor, and wherein the encrypted access request includes an encrypted identifier that is encrypted using a private key of a user;

determining, based on the encrypted access request, that the second client computing device is configured with access privileges to access the first private cloud; and granting access to the second client computing device to access the first private cloud based on the determining that the second client computing device is configured with the access privileges.

17. The non-transitory computer-readable medium of claim 16, wherein the location is an Internet Protocol (IP) address.

18. The non-transitory computer-readable medium of claim 16, wherein the function call is for an amount of files shared by the first private cloud, and wherein the expected response is a positive integer.

19. The non-transitory computer-readable medium of claim 16, wherein the function call is for a name of a file stored on the first private cloud.

20. The non-transitory computer-readable medium of claim 16, wherein the function call is for a location of a file stored on the first private cloud.

* * * * *